United States Patent [19]

Pond

[11] 4,380,884
[45] Apr. 26, 1983

[54] FISHING LURE

[76] Inventor: Robert B. Pond, P.O. Box 45, South Attleboro, Mass. 02703

[21] Appl. No.: 226,175

[22] Filed: Jan. 19, 1981

[51] Int. Cl.³ .............................................. A01K 85/00
[52] U.S. Cl. ................................... 43/42.09; 43/42.25
[58] Field of Search .................. 43/42.08, 42.09, 42.25, 43/42.28, 42.29, 42.39

[56] References Cited

U.S. PATENT DOCUMENTS

| 1,264,627 | 4/1918 | Foss .................................. 43/42.29 |
| 2,290,512 | 7/1942 | Weesner ............................ 43/42.09 |
| 2,590,633 | 3/1952 | Lucas ............................... 43/42.09 |

Primary Examiner—Nicholas P. Godici
Assistant Examiner—M. Jordan
Attorney, Agent, or Firm—Salter & Michaelson

[57] ABSTRACT

An artificial fishing lure is disclosed having a main body with a streamer detachably connected thereto. The body is cast from a weighted material such as lead with an open cavity and the locking portion of a clasp formed in the rear portion thereof. A wire bail is pivotally attached to said body, overlies a portion thereof and is received in said locking portion, whereby said bail, said body and said locking portion cooperate to define a clasp assembly on said body. The clasp assembly as formed is then used to detachably secure said streamer to said body to provide a universally adaptable fishing lure.

3 Claims, 15 Drawing Figures

U.S. Patent   Apr. 26, 1983   4,380,884
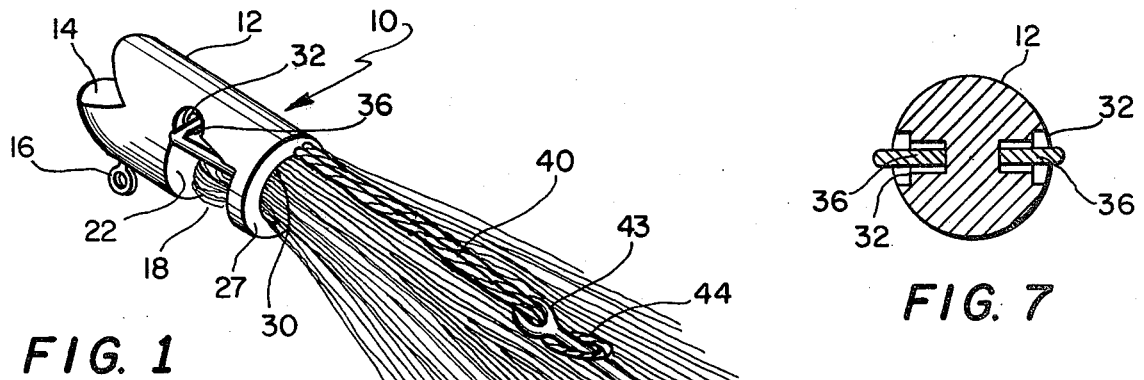
FIG. 1
FIG. 7
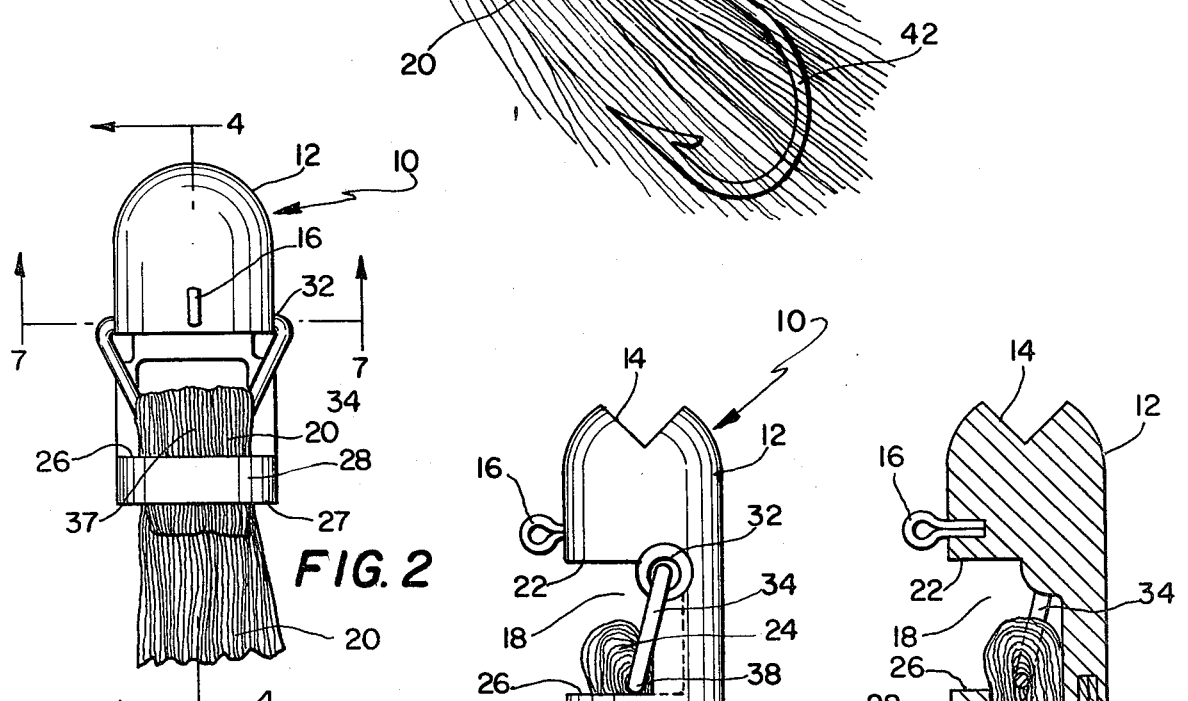
FIG. 2
FIG. 3
FIG. 4
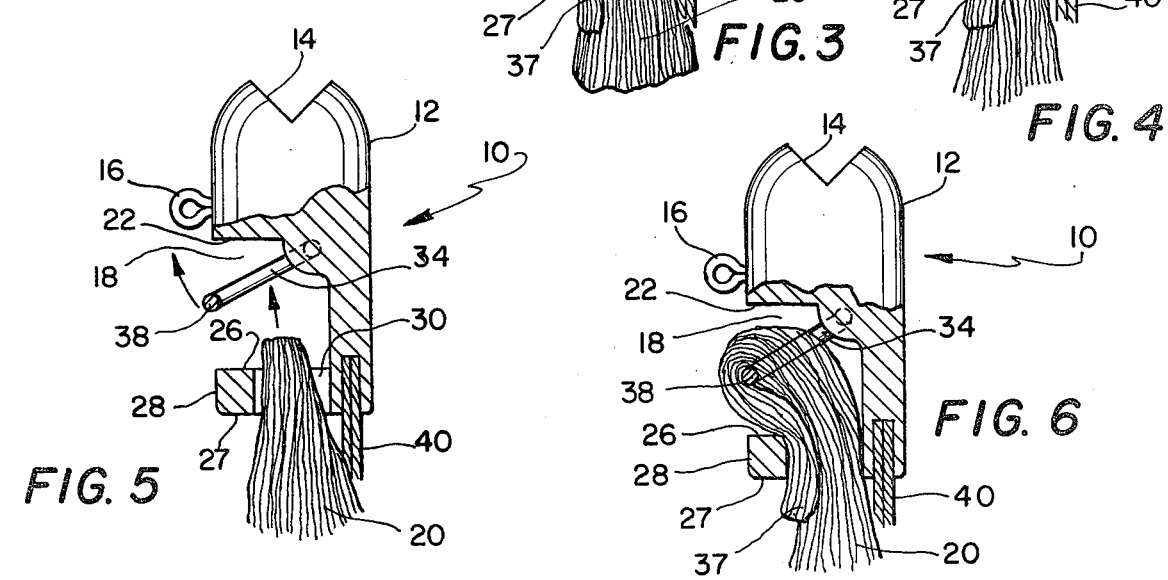
FIG. 5
FIG. 6

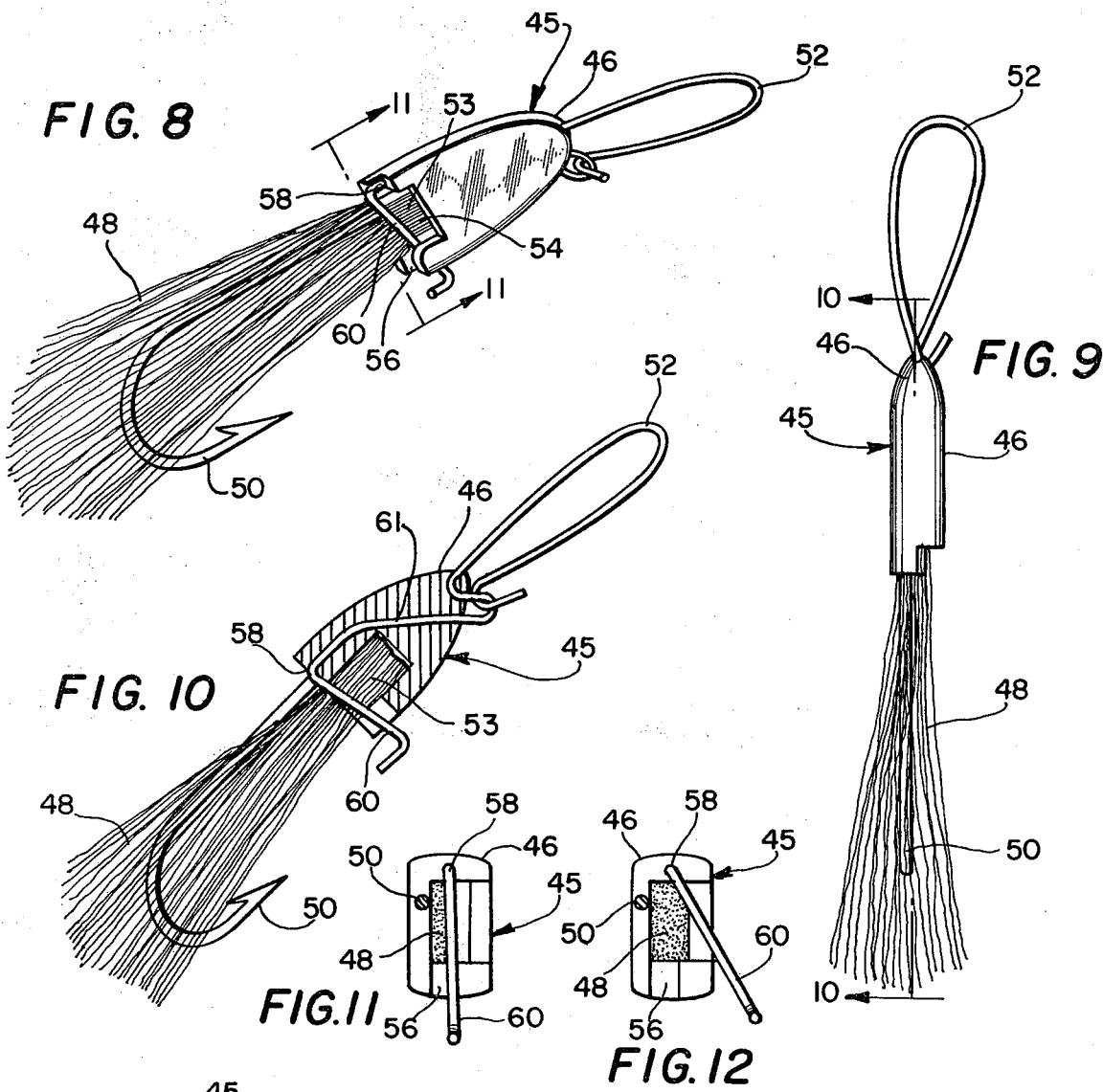
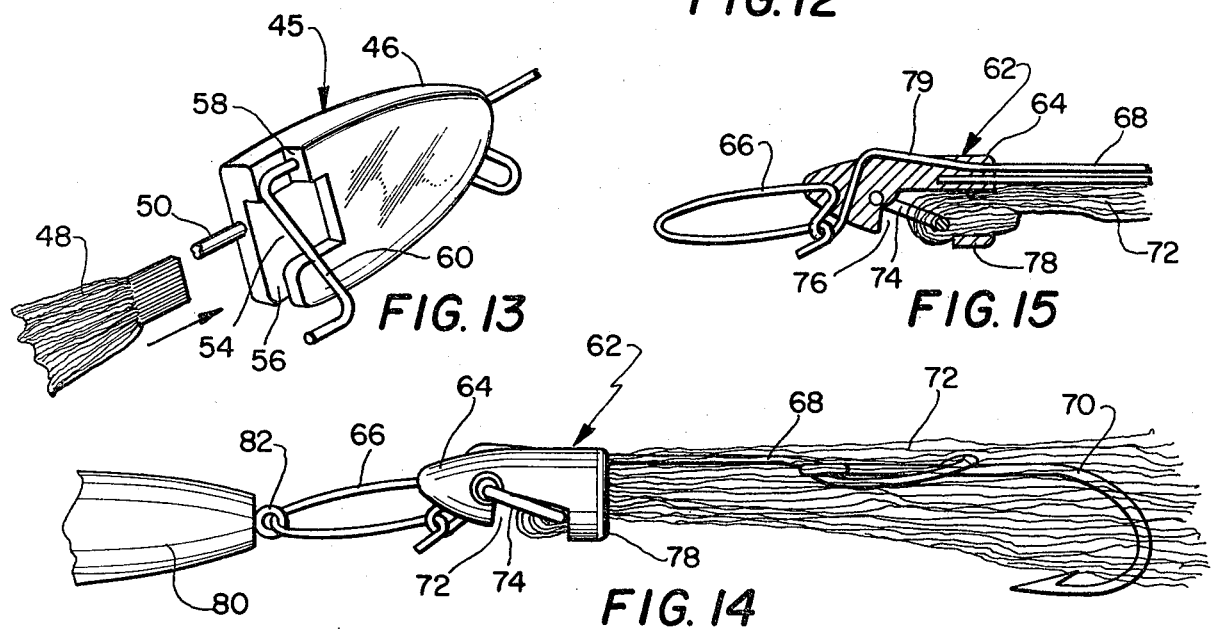

FISHING LURE

BACKGROUND OF THE INVENTION

The present invention relates to an artificial fishing lure and more particularly to a universally adaptable artificial fishing lure having a detachable streamer.

Fishing has always been one of America's favorite pastimes. Millions of Americans enjoy fishing as a form of relaxation, but obviously the goal of every fisherman is always to have a successful catch. As any experienced fisherman will attest, the degree of success he will have in fishing on any particular day depends on a multitude of factors including weather conditions, time of the day, phase of the moon, time of the year or feeding habits of the fish. The relative degree of success a fisherman will have also depends on his ability to adapt his techniques to compensate for these factors. The color of a fishing lure is of particular importance in this regard and may mean the difference between success and failure on any one day. Although fish are generally thought to be color blind, they are able to distinguish somewhat between different colors and particularly between bright and dull shades. The present invention relates to a fishing lure that has a detachable colored streamer and is therefore universally adaptable for various conditions. If a fisherman finds that he is having relatively poor success on a particular day, he can change the color of the streamer portion of his lure to attempt to improve his results. Formerly a fisherman had to carry a complete array of various colored lures to accomplish this objective, but with the fishing lure of the instant invention, he need only carry one lure of a particular type and a number of different colored streamers. He can then interchange the streamers as required to find the optimum color lure for any one day.

It is anticipated that the fishing lure of the instant invention will be especially well suited for fishing in ocean waters for blue fish and striped bass. Blue fish in particular can be very ravenous feeders and have extremely sharp teeth. A large blue fish can easily tear and destroy the streamer of an average fishing lure with his needle sharp teeth. Accordingly, the fishing lure of the instant invention represents a substantial improvement over those heretofore available by providing a lure with a detachable streamer which can be replaced if cut or damaged. This allows a fisherman to quickly and easily repair his lure by replacing the streamer instead of replacing the entire lure.

The concept of having a fishing lure with a detachable streamer is not entirely new and prior known devices which represent the best prior art of which the applicant is aware are illustrated in the U.S. Pat. Nos. to Hart, 2,278,876; Cummins, 2,568,488 and Ross, 3,405,475. However, the lures disclosed in these prior patents employed rather complicated clasping mechanisms for attaching the streamer portions to the main body of the lure. Also some of these lures required preformed streamer portions with mechanical clasps preattached thereto, and none of the prior known devices provided for a simple and effective way of replacing a streamer in the lure.

The artificial fishing lure of the instant invention represents a substantial improvement over these prior known lures by providing a simple clasp in the main body of the lure for the attachment of the streamer thereto. The clasp of the instant invention further employs a wire bail which is pivotally attached to the body of the lure and overlays a portion thereof and is received in a locking mechanism preformed in said body. When the clasp is in the closed or locked position, the wire bail and the body of the lure cooperate to retain the forward end of a streamer thereby firmly securing the streamer to said body in a simple and convenient manner.

SUMMARY OF THE INVENTION

The instant invention is directed to fishing lures and more specifically to a fishing lure having a main body with a streamer portion detachably connected thereto. The main body is preferably cast from a heavy material such as lead and is formed to simulate the body of a small fish. A rigid preformed wire is pivotally attached to said body and overlays a portion thereof to define the bail portion of a clasp. A portion of said bail is formed so that when the bail is pivoted inwardly toward the body it is received in the locking portion of a clasp formed therein, thereby defining the closed position of said clasp. The clasp is then used to hold and retain the forward end of a streamer by pinching it between said bail and said body. The streamer is changed or replaced quickly and easily by simply unlocking the clasp to release the tension between said bail and said body.

Accordingly, it is an object of the present invention to provide a fishing lure with a detachable streamer portion.

It is another object of the instant invention to provide a fishing lure that is universally adapted for fishing conditions.

It is a still further object of the instant invention to provide a fishing lure with a streamer portion which is easily replaced.

Other objects, features and advantages of the invention shall become apparent as the description thereof proceeds when considered in connection with the accompanying illustrative drawing.

DESCRIPTION OF THE DRAWING

In the drawings which illustrate the best mode presently contemplated for carrying out the present invention:

FIG. 1 is a perspective view of one form of the artificial fishing lure embodied in the instant invention;

FIG. 2 is a top plan view thereof;

FIG. 3 is a side elevational view thereof;

FIG. 4 is a sectional view taken along line 4—4 in FIG. 2;

FIG. 5 is a side elevational view with portions shown in section showing the wire bail pivoted outwardly for receiving the streamer portion for attachment thereto to the main body;

FIG. 6 is a view similar to FIG. 5 showing the forward end of the streamer extended around the bail portion of the clasp;

FIG. 7 is a sectional view taken along line 7—7 in FIG. 2;

FIG. 8 is a perspective view of another form of the artificial fishing lure of the instant invention;

FIG. 9 is a top plan view thereof;

FIG. 10 is a sectional view taken along line 10—10 in FIG. 9;

FIG. 11 is a sectional view taken along line 11—11 in FIG. 8 showing the bail portion of the clasp in the closed position;

FIG. 12 is a view similar to FIG. 11 showing the bail portion of the modified clasp in the open position;

FIG. 13 is a perspective view of the modified fishing lure illustrating the attachment of the streamer portion to the main body thereof; and FIG. 14 is a side elevational view of still another form of an artificial fishing lure embodied in the instant invention.

DESCRIPTION OF THE INVENTION

Referring now to the drawings and particularly to FIGS. 1 through 7 thereof, one form of the artificial fishing lure of the instant invention is illustrated and is generally indicated at 10. The lure 10 includes a main body 12 which is made of a weighted material such as lead and has a generally cylindrical configuration. A V-shaped notch 14 is formed in the front end of body 12 and imparts to the body 12 the appearance of the body of a small fish with its mouth open. A loop or ring 16 extends from the top front portion of body 12 for use in attaching the lure to a fishing line so that it may be pulled through the water. The rear portion of body 12 is formed with an open cavity 18 on one side thereof which receives a bail that is used for attaching a streamer indicated at 20 to the body 12. The cavity 18 as shown in FIGS. 1-6 and as formed in the rear of the body 12 is defined generally by a front wall 22 which extends inwardly toward the central axis of the body 12, an inner concave wall 24 which extends substantially parallel to said axis and a ring 28 that includes a front surface 26 which is substantially normal to said axis. The ring 28 is located at the rear of the body 12 and is defined by the front surface 26 that is substantially semicircular in configuration and a rear surface 27 that is substantially circular, the rear surface 27 having a circular bore 30 extending therethrough for communication with the cavity 18. As shown in FIGS. 1, 2 and 7, small opposed holes 32 are formed in the sides of the body 12 adjacent to the forward inner corners of the cavity 18. In order to removably mount the streamer 20 on the body 12, a wire bail 34 is provided and is formed in a substantially V-shaped configuration and includes inwardly directed ends 36 that extend into the holes 32 for pivotally attaching the bail 34 to the body 12, the bail 34 also including an apex 38 that defines the outermost end thereof. The bail 34 is formed so that when it is pivoted inwardly toward the main axis of the body 12 with a streamer 20 attached thereto, the apex 38 as formed by the V-shaped construction thereof partially extends into the bore 30 of the ring 28 and as will be described is retained therein. As a result of the cooperating relationship as described between the bail 34, body 12, bore 30 and ring 28, a clasp assembly is defined on the rear portion of the lure 10 which may be used for the attachment thereto of the streamer 20.

Referring now to FIGS. 3-6, the clasp assembly as described is shown with the bail 34 located in various positions in the attachment of the streamer 20 to the body 12. The clasp assembly is in its closed position in FIGS. 2, 3 and 4 in this position the forward end of the streamer 20 indicated at 37 extends forwardly through the bore 30 around the apex 38 of the bail 34 and then rearwardly again through the bore 30. In this position the bail 34 and particularly the apex 38 thereof cooperates with the inner surfaces of the bore 30 to provide sufficient tension therebetween to retain the forward portion 37 of the streamer 20 thereagainst and thereby secure it to the body 12. As seen in FIGS. 5 and 6, the bail 34 has been pivoted outwardly with the apex 38 thereof released from its position in the bore 30 to define the open position of the clasp. In this position the forward portion 37 of the streamer 20 has been moved around the bail 34 and into the bore 30 so that the streamer 20 is firmly secured to the body 12 when the clasp assembly is closed.

Referring again to FIG. 1, a wire loop 40 is shown extending rearwardly from the bottom side of the body 12 for the attachment of a fish hook 42 to lure 10. The fish hook 42 is attached to the wire loop 40 and thereby the body 12 by extending the wire loop 40 through an eye 43 of the hook 42, the wire loop 40 also extending around a shank portion 44 of the hook to secure the hook to the lure in a detachable manner so as to allow the removal or replacement thereof as desired.

Referring now to FIGS. 8-13, a modified form of the fishing lure of the invention is illustrated and is generally indicated at 45. The lure 45 consists primarily of a main body portion 46, a streamer 48 that is securable to the main body portion 46 and a fish hook 50 that is fixed in the body portion 46 and that extends rearwardly therefrom. A wire loop 52 extends forwardly from the front end of the lure 45 for attachment thereof to a fishing line (not shown). The main body portion 46 is preferably cast of a heavy metal material such as lead and, as seen in the drawing has a substantially flat configuration, the top and bottom edges thereof being defined generally by arcuate sides that join at the front end thereof to impart a somewhat streamlined appearance to the main body portion 46. An open cavity 54 is formed in the rear portion of main body portion 46 and is shaped to receive a substantially rectangular forward end 53 of the streamer 48 therein. Formed as part of the cavity 54 is a notch 56, the notch 56 being suitable for receiving and retaining the bail portion of a clasp therein as will be described.

Pivotally connected to the main body portion 46 at 58 is a wire bail 60 that extends transversely thereacross and is received in the notch 56. The wire bail 60, notch 56 and the inner surfaces of the cavity 54 cooperate to define a clasp for securing the streamer 48 to the lure 45 by pinching or grasping the forward end 53 thereof between the bail 60 and the inner surfaces of the cavity 54. As shown in FIG. 11, the clasp is located in the open position, wherein the bail 58 has been pivoted outwardly from the body 46 and around the pivot point 58. As seen in FIGS. 11 and 12, when bail 60 is moved from its open position (FIG. 12) to its closed position (FIG. 11), the forward portion of the streamer 48 is compressed against the inner wall of cavity 54 to thereby firmly secure it in place to the lure. As shown in FIG. 10, the wire bail 60 and the wire loop 52 are made from a single strand of wire which is formed in a series of bends and includes an intermediate portion indicated at 61. With the wire formed as indicated, the body 46 is cast therearound to encapsulate the intermediate portion within the cast body, thereby exposing the hook 52 and the bail 60.

Referring now to FIGS. 14 and 15, a still further embodiment of the invention is illustrated and is indicated generally at 62. The lure 62 includes a main body 64, a forward loop clasp 66, a rearwardly extending wire loop 68 having a fish hook 70 attached thereto and a rearwardly extending streamer 72. The streamer 72 is attached to the main body 64 by a V-shaped wire bail 74 that is similar to the wire bail illustrated in FIGS. 1-7 and that is pivotally mounted in the main body 64. A cavity 76 is formed in the main body 64 and a rear ring 78 is formed on the main body 64, the cavity 76 and ring 78 being substantially similar to the corresponding parts previously described and illustrated in FIGS. 1–7.

As seen in FIG. 15, a single strand of wire indicated at 79 is formed with a series of bends to define wire loop 68 and wire loop clasp 66, the wire strand 79 being encapsulated in the cast body 64 to expose the wire loop clasp 66 and the wire loop 68. It is also understood that the lure 62 as shown in FIGS. 14 and 15 may be used in combination with a float portion 80 by attaching the wire loop clasp 66 to an eyelet ring 82 that is secured to the float 80 thereby forming a tandem lure.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. An artificial fishing lure having a detachable streamer comprising:
   (a) a weighted body having the locking portion of a clasp formed therein and having a recessed cavity formed therein adjacent to said locking portion, said locking portion being of ring-like configuration and extending substantially transversely across the rear portion of said cavity;
   (b) a streamer element which is received in said cavity and extends through said ring-like locking portion;
   (c) a wire bail having at least one end which is attached to said body in a manner which allows pivotal movement of said bail relative to said body, said bail being positioned on said body so that it is detachably receivable in said locking portion with a portion of said bail extending across said cavity to retain said streamer element therein, whereby said bail and said body including said locking portion thereof cooperate to define a clasp on said lure for detachably receiving and retaining said streamer element in said cavity;
   (d) means attached to said body for the connection thereof to a pulling means; and
   (e) hook means attached to said body.

2. In the lure of claim 1, both ends of said bail being pivotally attached to said body said bail being of substantially V-shaped configuration, the apex of said bail being resiliently receivable in said ring-like locking portion to define said clasp.

3. In the lure of claims 1 or 2, said streamer element being looped around said bail to enhance the attachment thereof to said body.

* * * * *